(12) United States Patent
Yu

(10) Patent No.: US 10,840,640 B1
(45) Date of Patent: Nov. 17, 2020

(54) PLUGGABLE CONNECTOR

(71) Applicant: Optoway Technology Inc., Hsin Chu (TW)

(72) Inventor: Te-Shu Yu, Hsin Chu (TW)

(73) Assignee: Optoway Technology Inc., Hsin Chu (TW)

(*) Notice: Subject to any disclaimer, the term of this patent is extended or adjusted under 35 U.S.C. 154(b) by 0 days.

(21) Appl. No.: 16/699,704

(22) Filed: Dec. 1, 2019

Related U.S. Application Data

(60) Provisional application No. 62/875,951, filed on Jul. 18, 2019.

(30) Foreign Application Priority Data

Oct. 28, 2019 (TW) .............................. 108138797 A

(51) Int. Cl.
*H01R 13/629* (2006.01)
*H01R 13/635* (2006.01)

(52) U.S. Cl.
CPC ..... *H01R 13/62933* (2013.01); *H01R 13/635* (2013.01)

(58) Field of Classification Search
CPC ............ H01R 13/62933; H01R 13/635; H01R 13/62938
USPC ........................................................ 439/372
See application file for complete search history.

(56) References Cited

U.S. PATENT DOCUMENTS

| | | | | |
|---|---|---|---|---|
| 4,952,176 A | * | 8/1990 | Koiner ................. | H01R 13/645 439/681 |
| 6,533,603 B1 | * | 3/2003 | Togami ................. | G02B 6/4246 439/372 |
| 7,980,875 B2 | * | 7/2011 | Gosis ................... | H01R 13/639 439/265 |
| 8,391,667 B2 | * | 3/2013 | Teo ..................... | H01R 13/6272 385/139 |
| 8,724,955 B2 | | 5/2014 | LaVoie et al. | |
| 9,203,183 B2 | | 12/2015 | Konchan et al. | |

(Continued)

FOREIGN PATENT DOCUMENTS

| | | |
|---|---|---|
| CN | 203553495 | 4/2014 |
| TW | 200617456 | 6/2006 |
| TW | M562498 | 6/2018 |

OTHER PUBLICATIONS

"Office Action of Taiwan Counterpart Application", dated Sep. 11, 2020, p. 1-p. 11.

*Primary Examiner* — Hien D Vu
(74) *Attorney, Agent, or Firm* — JCIP Global Inc.

(57) ABSTRACT

A pluggable connector includes a housing, a handle, a rotating assembly, and a sliding block. The housing has a fastening portion disposed on a top surface of the housing. The handle has a first end portion and a second end portion. The first end portion passes through the housing and is located inside the housing, and the second end portion is located outside the housing. The rotating assembly is rotatably disposed in the housing and coupled to the first end portion of the handle. The sliding block is movably disposed on the top surface of the housing and adjacent to the fastening portion. When a force is exerted to the second end portion of the handle, the first end portion of the handle drives the rotating assembly to push the sliding block, so that the sliding block is moved toward the fastening portion.

22 Claims, 7 Drawing Sheets

(56) References Cited

U.S. PATENT DOCUMENTS

2004/0240792 A1\* 12/2004 Minota ................ G02B 6/3897
385/53

\* cited by examiner

PLUGGABLE CONNECTOR

CROSS-REFERENCE TO RELATED APPLICATION

This application claims the priority benefits of U.S. provisional application Ser. No. 62/875,951, filed on Jul. 18, 2019, and Taiwan application serial no. 108138797, filed on Oct. 28, 2019. The entirety of each of the above-mentioned patent applications is hereby incorporated by reference herein and made a part of this specification.

TECHNICAL FIELD

The disclosure relates to a connector and in particular relates to a pluggable connector which may be easily separated and withdrawn from a slot.

DESCRIPTION OF RELATED ART

When a conventional connector having a lever-type pulling member is withdrawn from a motherboard slot, a jumper wire connected to an input contact or an output contact of the connector should be removed first, and a spring of the motherboard slot is lifted by the pulling member, so as to separate and withdraw the connector from the motherboard slot.

Further, when the input contact or the output contact of the connector is shaped as a protrusion, a rotating movement path of the pulling member is blocked due to the interference of the protrusive input or output contact, so that the connector cannot be withdrawn from the motherboard slot with ease. The existing input contact and output contact are mostly shaped as concave slots, and thus the rotating movement path of the pulling member does not interfere with nor collides with the input contact and the output contact of the connector; however, the jumper wire connected to the input contact or the output contact of the connector is required to be removed, so that the connector and the slot may be separated from each other by the pulling member. As such, it has become an important issue to develop an easily pluggable connector with the input/output contact shaped in a free form.

SUMMARY

The disclosure provides a pluggable connector that is adapted to be removed from a slot when an external force is exerted to a handle, and it is not necessary to remove a jumper wire in advance. Besides, the issue of connector interference may also be prevented.

In an embodiment of the disclosure, a pluggable connector including a housing, a handle, a rotating assembly, and a sliding block is provided. The housing has a fastening portion disposed on a top surface of the housing. The handle has a first end portion and a second end portion. The first end portion passes through the housing and extends to the inside of the housing, and the second end position is located outside the housing. The rotating assembly is rotatably disposed in the housing and coupled to the first end portion of the handle. The sliding block is movably disposed on the top surface of the housing and adjacent to the fastening portion. Here, when a force is exerted to the second end portion of the handle, the first end portion of the handle drives the rotating assembly to push the sliding block, so that the sliding block is moved toward the fastening portion.

In an embodiment of the disclosure, a pluggable connector coupled to a slot having a spring is provided. The pluggable connector includes a housing, a handle, a rotating assembly, and a sliding block. The housing has a fastening portion disposed on a top surface of the housing. The handle has a first end portion and a second end portion. The first end portion passes through the housing and extends to the inside of the housing, and the second end position is located outside the housing. The rotating assembly is rotatably disposed in the housing and connected to the first end portion of the handle. The sliding block is movably disposed on the top surface of the housing and adjacent to the fastening portion. Here, the spring is coupled to the fastening portion and is in contact with the sliding block. When an external force is exerted to the second end portion of the handle, the handle is moved toward a first direction, and the first end portion of the handle drives the rotating assembly to push the sliding block to move toward a second direction opposite to the first direction, so that the sliding block abuts against the spring.

In view of the foregoing, as provided in one or more embodiments of the disclosure, when the external force is exerted to the handle of the pluggable connector, the sliding block may be driven to move toward the direction opposite to the handle and the external force, and the sliding block abuts against the spring of the slot, so that the pluggable connector may be released and withdrawn from the slot in response to the external pulling force. Compared to the conventional connector, it is not necessary to remove the jumper wire attached to the pluggable connector provided in one or more embodiments of the disclosure, and the movement path of the handle is not interfered by the contact.

In order to make the aforementioned features of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1A:
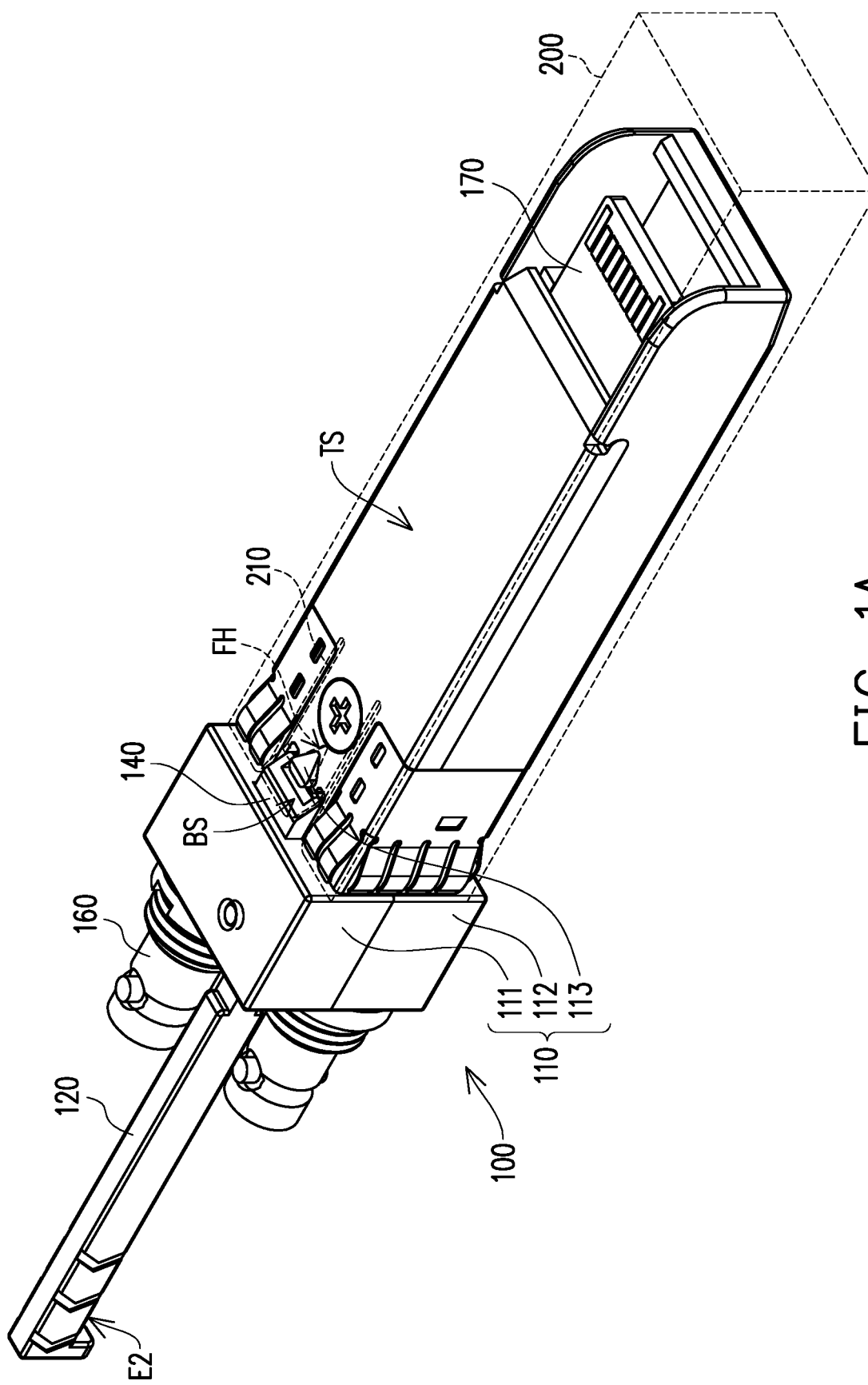
FIG. 1A is a schematic three-dimensional view illustrating a pluggable connector combined with a slot according to an embodiment of the disclosure.
Figure 1B:
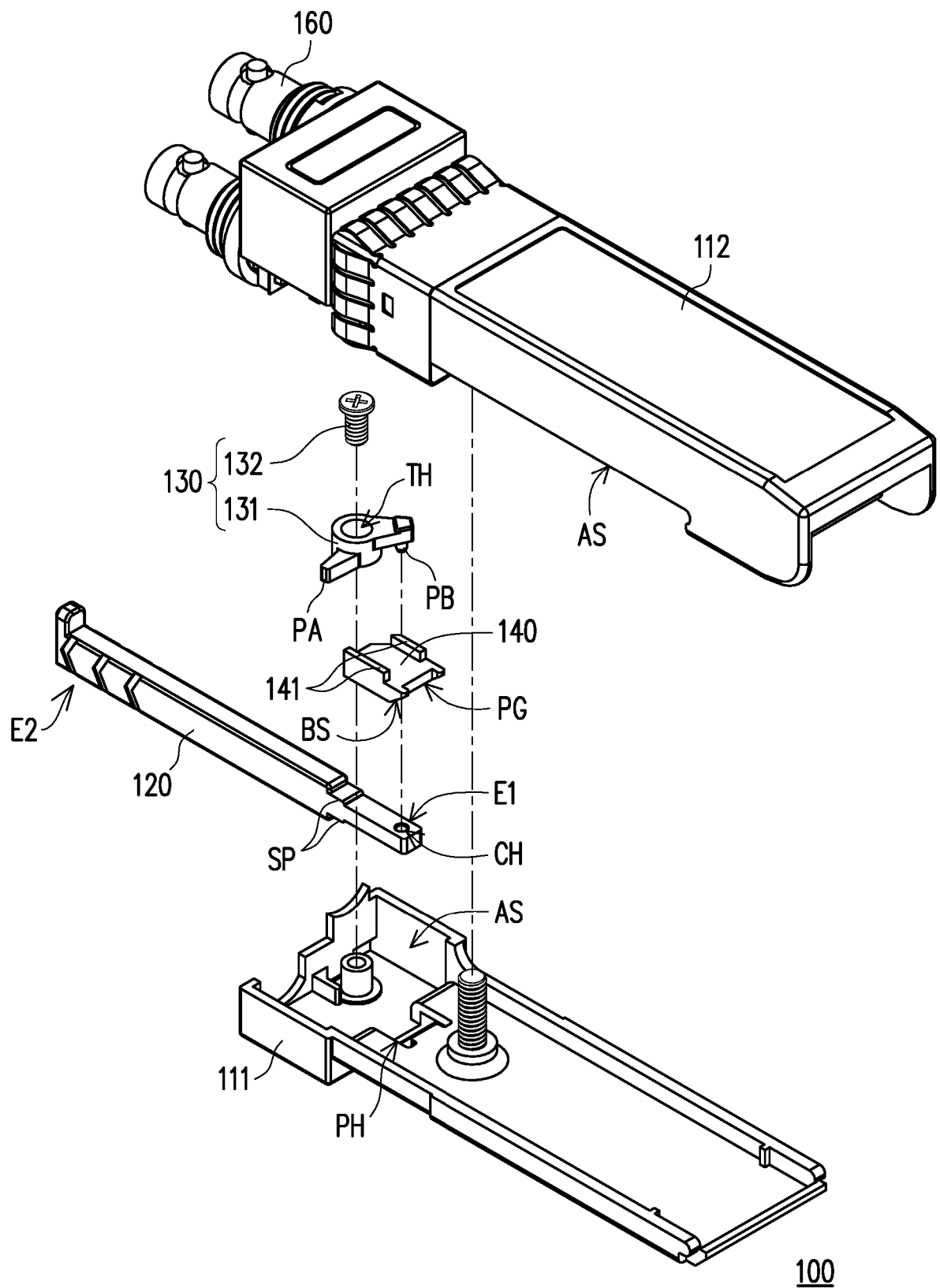
FIG. 1B is a schematic exploded view illustrating elements of the pluggable connector depicted in FIG. 1A.
Figure 1C:
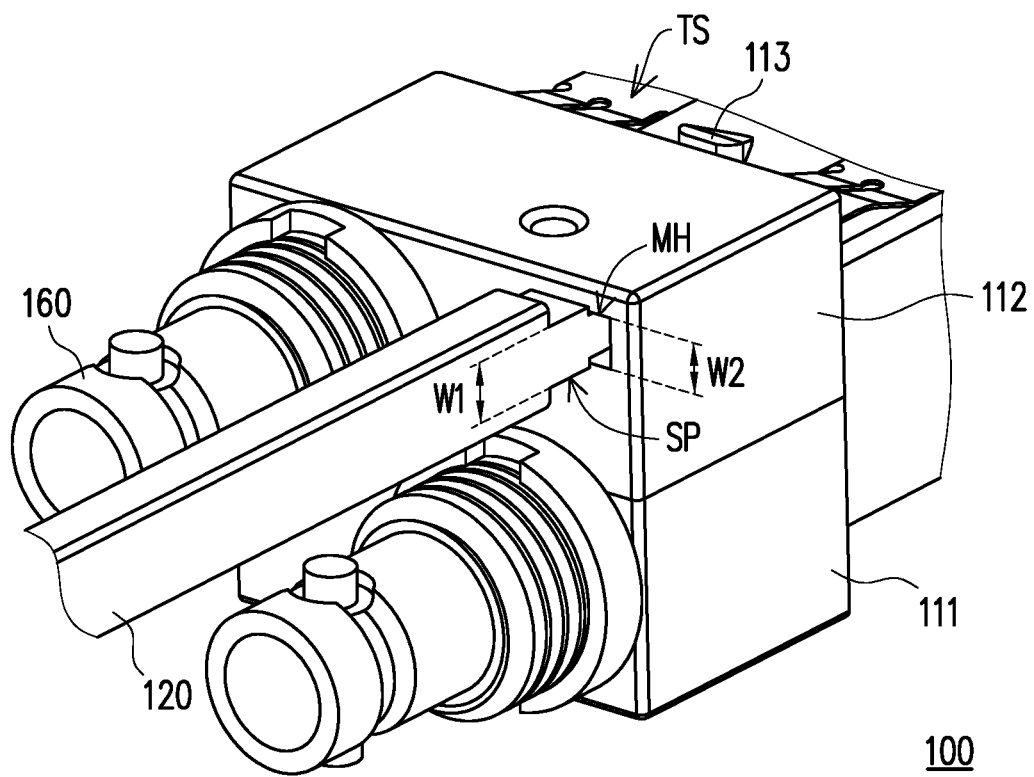
FIG. 1C is a schematic three-dimensional view illustrating some elements of the pluggable connector of FIG. 1A in another direction.

FIG. 1A is a schematic three-dimensional view illustrating a pluggable connector combined with a slot according to an embodiment of the disclosure. FIG. 1B is a schematic exploded view illustrating elements of the pluggable connector depicted in FIG. 1A. FIG. 1C is a schematic three-dimensional view illustrating some elements of the pluggable connector of FIG. 1A in another direction.

With reference to FIG. 1A, according to one or more embodiments of the disclosure, a pluggable connector 100 is coupled to a slot 200, and the slot 200 has a spring 210. In an embodiment, the slot 200 is, for instance, a variety of electronic sockets on a motherboard and is configured to transmit electric signal. In another embodiment, the pluggable connector 100 is configured to connect the motherboard and optical fiber of network equipment, which should however not be construed as a limitation in the disclosure.

With reference to FIG. 1A to FIG. 1C, the pluggable connector 100 includes a housing 110, a handle 120, a rotating assembly 130, and a sliding block 140.

The housing 110 has an upper casing 111, a lower casing 112, and a fastening portion 113. The upper casing 111 and the lower casing 112 together form an accommodation space AS. The fastening portion 113 is disposed on a top surface TS of the upper casing 111 of the housing 110. The fastening portion 113 has a triangular protrusion structure, and the spring 210 has a fastening hole FH. The fastening portion 113 is adapted to pass through the fastening hole FH of the spring 210 and is coupled thereto.

The handle 120 has a first end portion E1 and a second end portion E2. The first end portion E1 passes through the housing 110 and extends into the accommodation space AS. The second end portion E2 is located outside the housing 110 for a user to exert an external force F to pull the handle 120.

The rotating assembly 130 is rotatably disposed within the housing 110 and coupled to the first end portion E1 of the handle 120. In detail, the rotating assembly 130 is located in the accommodation space AS and connected to the upper casing 111. The first end portion of the handle 120 is located in the accommodation space AS to connect the rotating assembly 130. The sliding block 140 is movably disposed on the top surface TS of the housing 110 and adjacent to the fastening portion 113.

Figure 2A:
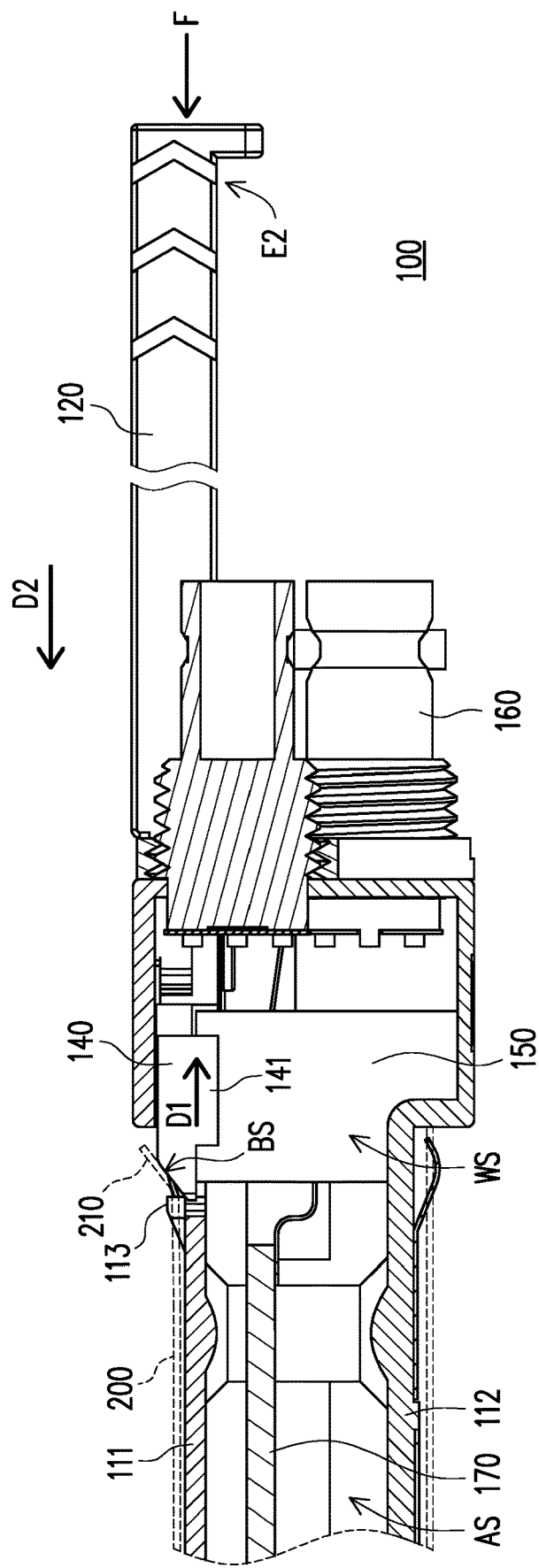
FIG. 2A is a schematic view illustrating that a slot and the pluggable connector depicted in FIG. 1A are being engaged.
Figure 2B:
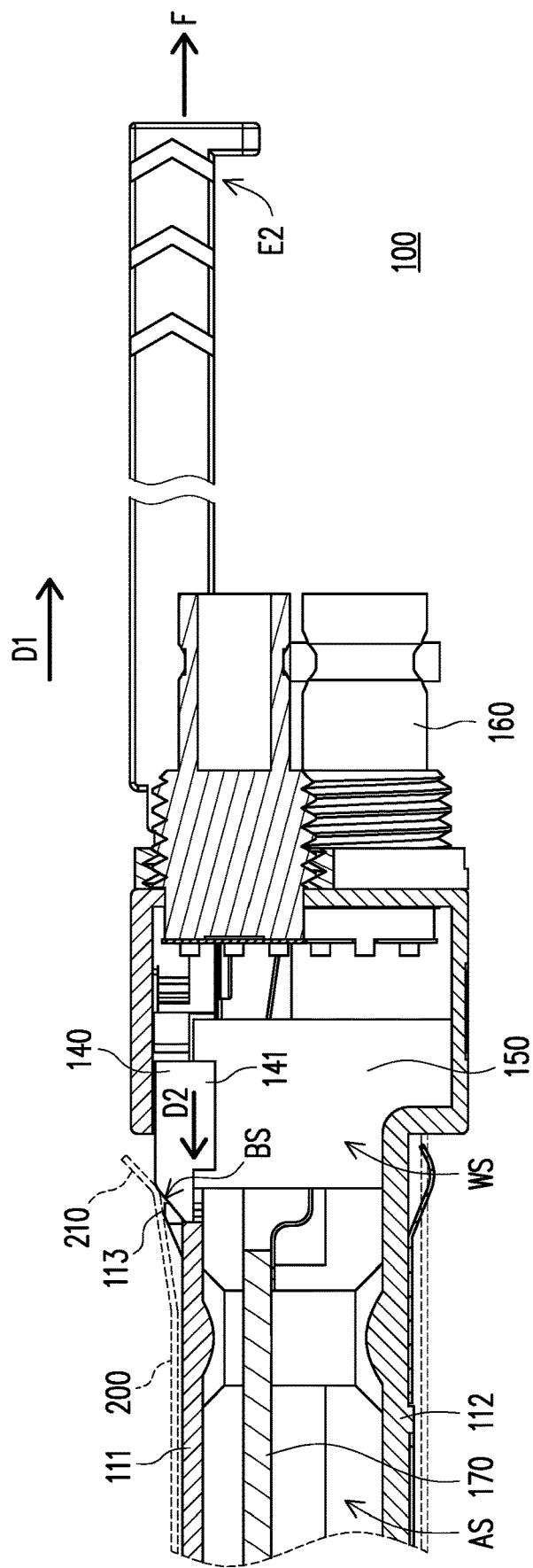
FIG. 2B is a schematic view illustrating that the pluggable connector depicted in FIG. 2A is withdrawn from the slot.

FIG. 2A is a schematic view illustrating that a slot and the pluggable connector depicted in FIG. 1A are being engaged. FIG. 2B is a schematic view illustrating that the pluggable connector depicted in FIG. 2A is withdrawn from the slot.

With reference to FIG. 1A, FIG. 2A, and FIG. 2B, when the second end portion E2 of the handle 120 is pulled, the first end portion E1 of the handle 120 drives the rotating assembly 130 to push the sliding block 140, so that the sliding block 140 is moved toward the fastening portion 113.

In detail, the spring 210 of the slot 200 is coupled to the fastening portion 113 of the housing 110 and is in contact with the sliding block 140. When the external force F is exerted to the second end portion E2 of the handle 120, the handle 120 is moved toward a first direction D1, and the rotating assembly 130 is driven by the first end portion E1 to push the sliding block 140 to move toward a second direction D2 opposite to the first direction D1, so that the sliding block 140 abuts against the spring 210, and that the fastening hole FH of the spring 210 is separated from the fastening portion 113.

With reference to FIG. 2A and FIG. 2B, the pluggable connector 100 further includes a support block 150 which is located in the accommodation space AS and respectively abuts against the lower casing 112 and the sliding block 140, so that the sliding block 140 is hung above the lower casing 112. The sliding block 140 has two opposite position limiting portions 141 respectively clamping surfaces WS of two opposite walls of the support block 150, so that the sliding block 140 is adapted to move relative to the support block 150. Due to the position limiting effects of the two position limiting portions 141, the sliding block 140 is limited to move in a linear manner.

Figure 3A:
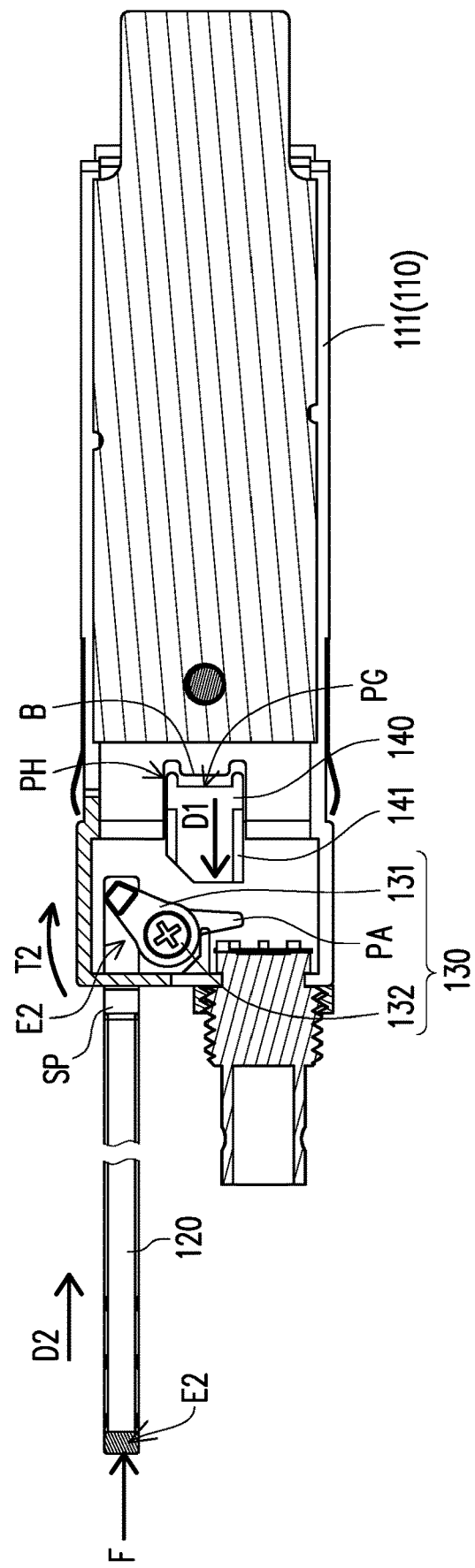
FIG. 3A and FIG. 3B illustrate a state switching action of the handle, the rotating assembly, and the sliding block of the pluggable connector depicted in FIG. 1A.
Figure 3B:
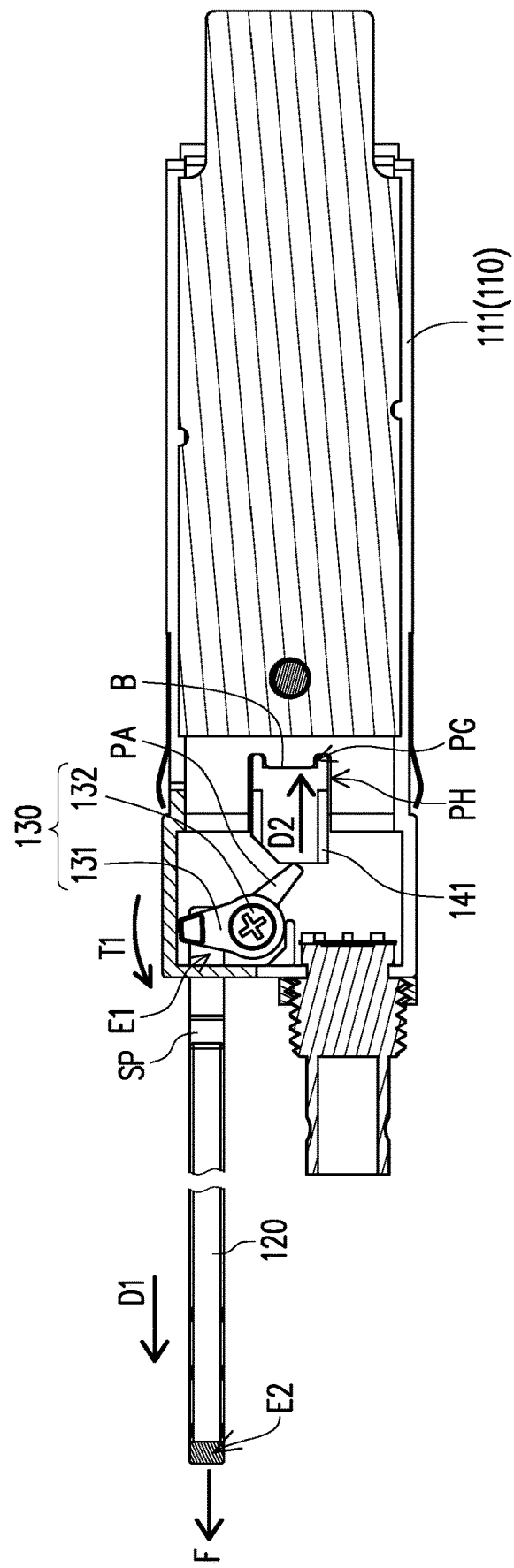

FIG. 3A and FIG. 3B illustrate a state switching action of the handle, the rotating assembly, and the sliding block of the pluggable connector depicted in FIG. 1A.

With reference to FIG. 1A, FIG. 1C, FIG. 3A, and FIG. 3B, the upper casing 111 of the housing 110 has a penetrating hole PH communicating with the accommodation space AS. The sliding block 140 is movably disposed in the penetrating hole PH and partially protrudes from the top surface TS of the upper casing 111, and a side of the sliding block 140 facing the fastening portion 113 has a bevel surface BS.

Further, a positioning groove PG is formed on the side of the sliding block 140 having the bevel surface BS (not shown in the drawings). A stopper B is formed at an inner edge of the penetrating hole PH and is aligned to the positioning groove PG. The positioning groove PG and the stopper B are adapted to be joined in a mortise-tenon manner.

The rotating assembly 130 includes a rotating block 131 and a bolt 132. A portion of the rotating block 131 is coupled to the first end portion E1 of the handle 120. Specifically, the rotating block 131 has a through hole TH, a pillar body PB, and a pushing portion PA. The bolt 132 penetrates the through hole TH and is fixed to the upper casing 111 of the housing 110, and the rotating block 131 is adapted to be pivotally rotated relative to the bolt 132. The pillar body PB and the pushing portion PA are respectively formed on the peripheral wall surface of the rotating block 131, and the pillar body PB is pivotally connected to a concave hole CH of the first end portion E1 of the handle 120. The pushing portion PA is aligned to the sliding block 140, and the pushing portion PA is configured to push the sliding block 140.

The flowchart illustrating steps of switching the engagement state of the pluggable connector 100 and the slot 200 to the released state is elaborated hereinafter.

With reference to FIG. 1A, FIG. 1C, FIG. 2A, and FIG. 3A, when the pluggable connector 100 and the slot 200 are being engaged, the spring 210 of the slot 200 is engaged with the fastening portion 113 of the housing 110 (see FIG. 2A). Here, the pushing portion PA of the rotating assembly 130 is relatively far away and does not push the sliding block 140, so that the positioning groove PG of the sliding block 140 is separated from the stopper B in the penetrating hole PH. In this engagement state, the bevel surface BS of the sliding block 140 does not abut against the spring 210.

With reference to FIG. 2B and FIG. 3B, the external force F propagating toward the first direction D1 is exerted to pull the second end portion E2 of the handle 120. When the second end portion E2 of the handle 120 is moved toward the first direction D1 away from the housing 110 (see FIG. 2B), through the pillar body PB pivotally rotated in the through hole TH, the first end portion E1 drives the rotating block 131 to pivotally rotate relative to the bolt 132 in a first rotation direction T1, so that the pushing portion PA pushes the sliding block 140 to move in a second direction D2 opposite to the first direction D1. The sliding block 140 is then moved toward the stopper B in the penetrating hole PH until the positioning groove PG and the stopper B are engaged. This indicates that the sliding block 140 has been moved to the fixed position; meanwhile, the bevel surface BS of the sliding block 140 pushes the spring 210 of the slot 200, so that the spring 210 is deformed and separated from the fastening portion 113 of the housing 110. Thereby, the pluggable connector 100 is released from the slot 200, and the engagement state is switched to the released state. The pluggable connector 100 may be pulled and removed from the slot 200 by continuously exerting the force.

With reference to FIG. 1A, FIG. 1C, FIG. 2A, and FIG. 3A, in addition, the external force F propagating in the second direction D2 is exerted to push the second end portion E2 of the handle 120. When the second end portion E2 of the handle 120 is moved toward the second direction D2 to approach the housing 110, through the pillar body PB pivotally rotated at the through hole TH, the first end portion E1 drives the rotating block 131 to be pivotally rotated relative to the bolt 132 in a second rotation direction T2 opposite to the first rotation direction T1, so that the pushing portion PA of the rotating block 131 is moved away from the sliding block 140. On this condition, the sliding block 140 is not pushed by the pushing portion PA and is adapted to move freely in the penetrating hole PH. When the pluggable connector 100 passes through the slot 200, the sliding block 140 is pushed against the spring 210 and is relatively away from the fastening portion 113, so that the spring 210 is engaged with the fastening portion 113 and switched to the engagement state.

With reference to FIG. 1B, FIG. 3A, and FIG. 3B, the housing 110 has a first opening MH. The first end portion E1 of the handle 120 passes through the first opening MR and is located in the accommodation spaces AS, and the handle 120 has a stepped portion SP. A thickness size W1 of the stepped portion SP is greater than a width size W2 of the first opening MH, so as to limit the movement distance of the handle 120 relative to the housing 110. In short, the stepped portion SP may prevent the first end portion E1 from driving the rotating assembly 130 to overly rotate in the housing 110, so as to avoid collision damages.

With reference to FIG. 1A and FIG. 3A, the pluggable connector 100 further includes at least one contact 160 and a circuit board 170. The at least one contact 160 partially passes through the housing 110, and the handle 120 is substantially parallel to the at least one contact 160. The circuit board 170 partially penetrates the housing 110 and is electrically coupled to the at least one contact 160 via internal wires. In addition, the movement direction of the handle 120 is parallel to an extension direction of the at least one contact 160, so as to prevent the handle 120 from interfering with the at least one contact 160 during the movement. Further, in other embodiments, the number of the at least one contact 160 may be plural, which may be determined according to actual design requirements.

To sum up, as provided in one or more embodiments of the disclosure, when the external force is exerted to the handle of the pluggable connector, the sliding block may be driven to move toward the direction opposite to the handle and the external force, and the sliding block abuts against the spring of the slot, so that the pluggable connector may be released and withdrawn from the slot in response to the external pulling force. Compared to the conventional connector, it is not necessary to remove the jumper wire attached to the pluggable connector provided in one or more embodiments of the disclosure, and the movement path of the handle is not interfered by the contact.

Although the disclosure has been disclosed in the above embodiments, it is not intended to limit the disclosure, and any one of ordinary skill in the art will be able to make some modifications and refinements without departing from the spirit and scope of the disclosure. The scope of the disclosure is defined by the scope of the appended claims.

What is claimed is:

1. An optoelectronic pluggable connector comprising:
   a housing having a fastening portion disposed on a top surface of the housing;
   a handle having a first end portion and a second end portion, the first end portion passing through the housing, the second end portion being located outside the housing;
   a rotating assembly rotatably disposed in the housing and connected to the first end portion of the handle; and
   a sliding block movably disposed on the top surface of the housing and adjacent to the fastening portion,
   wherein when a force is exerted to the second end portion of the handle by pushing the second end portion of the handle toward the rotating assembly, the first end portion of the handle drives the rotating assembly to push the sliding block, so that the sliding block is moved toward the fastening portion;
   wherein the housing comprises an upper casing and a lower casing, the upper casing and the lower casing together form an accommodation space, the rotating assembly is located in the accommodation space and connected to the upper casing, and the first end portion of the handle is located in the accommodation space to connect the rotating assembly.

2. The optoelectronic pluggable connector according to claim 1, further comprising a support block located in the accommodation space and respectively abutting against the lower casing and the sliding block, so that the sliding block is hung above the lower casing, and the sliding block has two opposite position limiting portions respectively clamping surfaces of two opposite walls of the support block, so that the sliding block is adapted to move relative to the support block.

3. The optoelectronic pluggable connector according to claim 1, wherein the housing has a penetrating hole, the sliding block is movably disposed in the penetrating hole and partially protrudes from the top surface, and a side of the sliding block facing the fastening portion has a bevel surface.

4. The optoelectronic pluggable connector according to claim 3, wherein a positioning groove is formed on the side of the sliding block having the bevel surface, and a stopper is formed at an inner edge of the penetrating hole and aligned to the positioning groove, wherein the positioning groove and the stopper are adapted to be joined in a mortise-tenon manner.

5. The optoelectronic pluggable connector according to claim 1, wherein the rotating assembly comprises a rotating block, and a portion of the rotating block is coupled to the first end portion of the handle.

6. The optoelectronic pluggable connector according to claim 5, wherein the rotating block comprises a pushing portion configured to push the sliding block.

7. The optoelectronic pluggable connector according to claim 6, wherein the rotating assembly further comprises a bolt, the rotating block further comprises a through hole and a pillar body, the bolt penetrates the through hole and is fixed to the housing, the rotating block is adapted to be pivotally rotated relative to the bolt, the pillar body is pivotally connected to a concave hole of the first end portion, and the pushing portion is aligned to the sliding block.

8. The optoelectronic pluggable connector according to claim 7, wherein when the second end portion of the handle is moved toward a first direction to be away from the housing, the first end portion drives the rotating block through the pillar body to be pivotally rotated toward a first rotation direction, so that the pushing portion pushes the sliding block to move toward a second direction opposite to the first direction.

9. The optoelectronic pluggable connector according to claim 8, wherein when the second end portion of the handle is moved toward the second direction to approach the housing, the first end portion drives the rotating block through the pillar body to be pivotally rotated toward a second rotation direction opposite to the first rotation direction, so that the pushing portion is away from the sliding block.

10. The optoelectronic pluggable connector according to claim 1, wherein the housing has a first opening, the handle passes through the first opening, the first end portion is located in the housing, the handle has a stepped portion, and a thickness size of the stepped portion is greater than a width size of the first opening, so as to limit a movement distance of the handle relative to the housing.

11. The optoelectronic pluggable connector according to claim 1, further comprising at least one contact partially passing through the housing, the handle being substantially parallel to the at least one contact.

12. An optoelectronic pluggable connector coupled to a slot, the slot having a spring, the ptoelectronic pluggable connector comprising:
a housing having a fastening portion disposed on a top surface of the housing;
a handle having a first end portion and a second end portion, the first end portion passing through the housing, the second end portion being located outside the housing;
a rotating assembly rotatably disposed in the housing and coupled to the first end portion of the handle; and
a sliding block movably disposed on the top surface of the housing and adjacent to the fastening portion,
wherein the spring is coupled to the fastening portion and is in contact with the sliding block, when an external force is exerted to the second end portion of the handle by pushing the second end portion of the handle toward the rotating assembly, the handle is moved toward a first direction and drives the rotating assembly through the first end portion to push the sliding block to move toward a second direction opposite to the first direction, so that the sliding block abuts against the spring;
wherein the housing comprises an upper casing and a lower casing, the upper casing and the lower casing together form an accommodation space, the rotating assembly is located in the accommodation space and connected to the upper casing, and the first end portion of the handle is located in the accommodation space to connect the rotating assembly.

13. The optoelectronic pluggable connector according to claim 12, further comprising a support block located in the accommodation space and respectively abutting against the lower casing and the sliding block, so that the sliding block is hung above the lower casing, and the sliding block has two opposite position limiting portions respectively clamping surfaces of two opposite walls of the support block, so that the sliding block is adapted to move relative to the support block.

14. The optoelectronic pluggable connector according to claim 12, wherein the housing has a penetrating hole, the sliding block is movably disposed in the penetrating hole and partially protrudes from the top surface, and a side of the sliding block facing the fastening portion has a bevel surface.

15. The optoelectronic pluggable connector according to claim 14, wherein a positioning groove is formed on the side of the sliding block having the bevel surface, and a stopper is formed at an inner edge of the penetrating hole and aligned to the positioning groove, wherein the positioning groove and the stopper are adapted to be joined in a mortise-tenon manner.

16. The optoelectronic pluggable connector according to claim 12, wherein the rotating assembly comprises a rotating block, and a portion of the rotating block is coupled to the first end portion of the handle.

17. The optoelectronic pluggable connector according to claim 16, wherein the rotating block comprises a pushing portion configured to push the sliding block.

18. The optoelectronic pluggable connector according to claim 17, wherein the rotating assembly further comprises a bolt, the rotating block further comprises a through hole and a pillar body, the bolt penetrates the through hole and is fixed to the housing, the rotating block is adapted to be pivotally rotated relative to the bolt, the pillar body is pivotally connected to a concave hole of the first end portion, and the pushing portion is aligned to the sliding block.

19. The optoelectronic pluggable connector according to claim 18, wherein when the second end portion of the handle is moved toward a first direction to be away from the housing, the first end portion drives the rotating block through the pillar body to be pivotally rotated toward a first rotation direction, so that the pushing portion pushes the sliding block to move toward a second direction opposite to the first direction.

20. The optoelectronic pluggable connector according to claim 19, wherein when the second end portion of the handle is moved toward the second direction to approach the housing, the first end portion drives the rotating block through the pillar body to be pivotally rotated toward a second rotation direction opposite to the first rotation direction, so that the pushing portion is away from the sliding block.

21. The optoelectronic pluggable connector according to claim 12, wherein the housing has a first opening, the first end portion passes through the first opening, the handle has a stepped portion, and a thickness size of the stepped portion is greater than a width size of the first opening, so as to limit a movement distance of the handle relative to the housing.

22. The optoelectronic pluggable connector according to claim 12, further comprising at least one contact passing through the housing, the handle being substantially parallel to the at least one contact.

* * * * *